United States Patent
Janus et al.

(10) Patent No.: US 7,353,372 B2
(45) Date of Patent: Apr. 1, 2008

(54) DETECTION OF SUPPORT COMPONENTS FOR ADD-IN CARD

(75) Inventors: Scott Janus, Davis, CA (US); Adam H. Wilen, Fair Oaks, CA (US); David A. Wyatt, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 475 days.

(21) Appl. No.: 10/329,026

(22) Filed: Dec. 24, 2002

(65) Prior Publication Data

US 2004/0122992 A1   Jun. 24, 2004

(51) Int. Cl.
*G06F 9/00* (2006.01)
*G06F 13/00* (2006.01)
*G06F 13/14* (2006.01)

(52) U.S. Cl. ............... 713/1; 710/100; 345/520
(58) Field of Classification Search .......... 713/1, 713/100; 345/501, 502, 503, 520; 710/100, 710/8, 11, 107
See application file for complete search history.

(56) References Cited

U.S. PATENT DOCUMENTS

| | | | | |
|---|---|---|---|---|
| 5,630,174 A | * | 5/1997 | Stone et al. | 710/63 |
| 6,009,480 A | * | 12/1999 | Pleso | 710/8 |
| 6,141,021 A | * | 10/2000 | Bickford et al. | 345/503 |
| 6,292,859 B1 | * | 9/2001 | Santiago | 710/107 |
| 6,532,019 B1 | * | 3/2003 | Gulick et al. | 345/519 |
| 6,724,389 B1 | * | 4/2004 | Wilen et al. | 345/520 |
| 6,832,269 B2 | * | 12/2004 | Huang et al. | 710/11 |
| 6,880,104 B2 | * | 4/2005 | Abe et al. | 714/24 |
| 7,007,159 B2 | * | 2/2006 | Wyatt | 713/1 |

FOREIGN PATENT DOCUMENTS

JP   10187590 A   *   7/1998

OTHER PUBLICATIONS

Electronic, Products—Digital Semiconductors: Atmel annunces serial EEPROM, Jun. 15, 1998, p. 1.*

* cited by examiner

*Primary Examiner*—Suresh K Suryawanshi
(74) *Attorney, Agent, or Firm*—Derek J. Reynolds; Intel Corporation (57) ABSTRACT

Embodiments of the present invention provide detection, enumeration, and software configuration of optional choice of add-in cards types through a multiplexed bus interface. The PROM allows identification of the add-in device and software configuration to adapt to support it. In particular, plug and play detection of digital display codec devices and display and integration of software and firmware support for devices inside the add-in card are provided for.

38 Claims, 8 Drawing Sheets

| Bit Field | Value | Meaning |
|---|---|---|
| 3:0 | 00h | Invalid (No ADD Card) |
| | 01h | Has the I²C SPD, use the SPD to obtain Configuration/Codec information Bits 7:4 I²C Addressing Method |
| | xxh | Fixed List Codec Identifier for DVO-C, or for DVO-B/C in dual-channel mode (Refer to the ADD EDS)<br>Bits 5:4 I²C Device Revision ID<br>Bits 7:6 Board (OEM Sub-System) vendor ID |
| | 0Fh | Invalid (No ADD Card) |

FIG. 5

| ADD Card | ID Source | Plug & Play ID | Bios Boot Support |
|---|---|---|---|
| One of Fixed List | ADD_ID | PnP ID = Table [ADD_ID] (Fixed Table in firmware) | Exists in Firmware |
| One of Fixed List | SPD ID Filed | Function of [SPD VID+DID] | Exists in Firmware, overridden by extended configuration in SPD |
| Dynamic (plug-in) Support | SPD ID Filed | Function of [SPD VID+DID] | Firmware + SPD |

FIG. 6

ADD_ID = 01h
(= SPD)

Re-Uses Slave Address
Single Byte
Double Byte
Reserved

| 7 | 6 | 5 | 4 | 3 | 2 | 1 | 0 |
|---|---|---|---|---|---|---|---|
| ADD_ID Register Bits ||||||||

FIG. 7

| Bits | Definition | Value | Meaning |
|---|---|---|---|
| 7:4 | I2C Addressing Method | 0h | Not Valid |
| | | 01h | Re-uses the Slave Address field for upper bits |
| | | 02h | Single Byte Addressing |
| | | 03h | 1 1/2 Byte Addressing (upper bits in Slave Address) |
| | | 04h | Double Byte Addressing |
| | | 05h | 2 1/2 Byte Addressing (upper bits in Slave Address) |
| | | 06h | Triple Byte Addressing |
| | | 07h | 3 1/2 Byte Addressing (upper bits in Slave Address) |
| | | 08h-0Fh | Reserved |
| 3:0 | ADD_ID | 01h | The SPD is present, bits 7:4 indicate addressing scheme |

FIG. 8

FIG. 9

DETECTION OF SUPPORT COMPONENTS FOR ADD-IN CARD

BACKGROUND

Conventionally, the use of "daughter-cards" is the primary means by which to include display encoder flexibility on integrated (or embedded) graphics motherboards. These daughter-cards are not intended to be "plug and play" friendly. In particular, the daughter-cards do not have unique identifiers, nor do the devices on them necessarily have a consistent method by which the hardware can be identified.

The limitation of this solution is that the range of daughter-cards supported is limited by the ability of the software on the platform to quickly and accurately identify the attached card, and includes the assumption that the support for that particular card must be included in the platform firmware and software prior to the introduction of the card. In fact, the speed with which this existing solution can identify the attached card/device/hardware is proportional to the number of supported cards/devices (i.e. software enumeration must step through testing for each combination sequentially), rendering the previous method unviable when the potential number of variations of cards is arbitrary and the number of new-devices is increasing. This is an important issue particularly as fast boot time is increasingly a priority of the platform. Moreover, with existing daughter-cards, the video BIOS must be updated before the part can be supported. This is impractical if the platform has already been shipped.

DETAILED DESCRIPTION OF THE INVENTION

Embodiments of the present invention provide detection, enumeration, and software configuration of optional choice of add-in cards types through a multiplexed bus interface. The invention may be extended to other multiplexed busses, for example, an alternative private acceleration bus to a supplementary graphics accelerator. The PROM allows identification of the add-in device and software configuration to adapt to support it. In particular, plug and play detection of digital display codec devices and display and integration of software and firmware support for devices inside the add-in card are provided for.

In the description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For examples, although the description of the invention is directed to the digital video output (DVO) graphics modes, the invention can be practiced for other graphics modes having similar characteristics. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. Also, the invention may be implemented on a number of different busses, including but not limited, to applications for serial DVO on PCI Express and audio.

Figure 1:
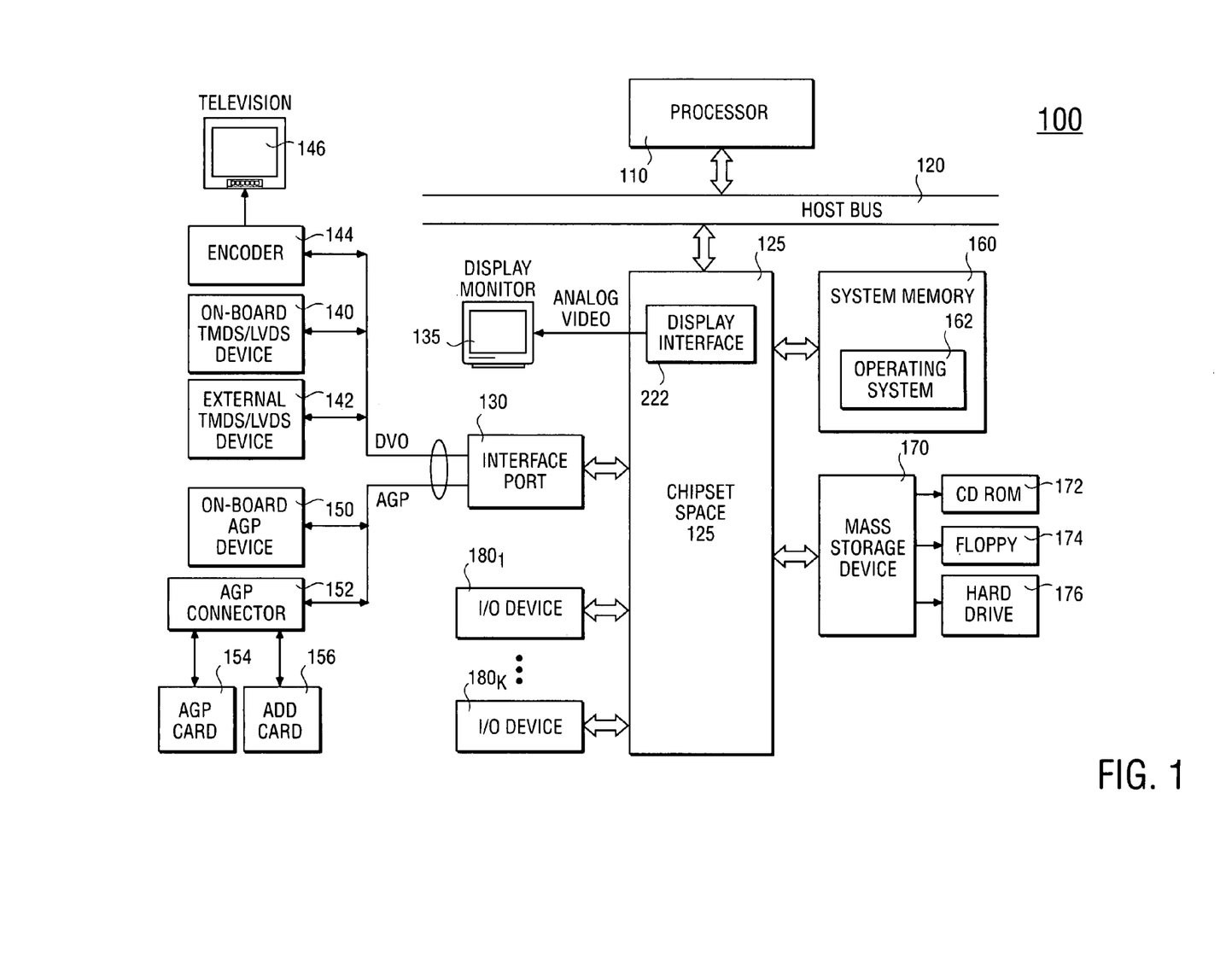
FIG. 1 is a diagram illustrating a system in which one embodiment of the invention can be practiced.

FIG. 1 is a diagram illustrating a computer system 100 in which one embodiment of the invention can be practiced. The computer system 100 includes a processor 110, a host bus 120, a chipset space 125, an interface port 130, an on-board digital video output (DVO) device 140, an external DVO device 142, an encoder 144, a television set 146, an on-board accelerated graphics port (AGP) device 150, an AGP connector 152, an external AGP device 154, an AGP digital display (ADD) card 156, a system memory 160, a mass storage device 170, and input/output devices $180_1$ to $180_K$. Note that not all of these devices are present in a typical system. In some cases, the presence of a device precludes another device. For example, if an on-board device is present, an external similar device is not needed.

The processor 110 represents a central processing unit of any type of architecture, such as embedded processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In one embodiment, the processor 110 is compatible with the Intel Architecture (IA) processor, such as the IA-32 and the IA-64. The host bus 120 provides interface signals to allow the processor 110 to communicate with other processors or devices, e.g., the memory controller 130. The host bus 120 may support a uni-processor or multiprocessor configuration. The host bus 120 may be parallel, sequential, pipelined, asynchronous, synchronous, or any combination thereof.

The chipset space 125 is a space to receive one or more chipsets. The chipset(s) to be plugged into the chipset space 125 may be an integrated chipset or chipsets with separate functionalities. The integrated chipset may have functionalities equivalent to a memory controller, a graphics controller, and an input/output (I/O) controller. The separate chipsets may include a memory controller chipset and an I/O controller chipset. The invention provides a mechanism to maintain compatibility with various configurations for the chipset space 125.

The interface port 130 provides connection pins to interface to a number of devices. The interface port 130 includes multiplexed pins to support at least two graphics modes. In one embodiment, these graphics mode includes a DVO mode and an AGP mode. The common interface port is not critical to the invention. For example, embodiments of the invention can also be implemented on dual interface ports and so forth.

The on-board and external TMDS/LVDS devices 140 and 142 are graphic devices that interface to the DVO signaling from the interface port 130. The on-board TMDS/LVDS device 140 is located on the motherboard containing the processor 110 while the external TMDS/LVDS device 142 is an add-on card to be plugged into a slot having interface to the interface port 130. The TMDS/LVDS devices 140 and 142 drive a flat panel display or a digital display monitor through a TMDS/LVDS transmitter. The encoder 144 encodes the digital pixel data generated by the graphics controller from the chipset at the chipset space 125 into a usable video signal. The television set 146 receives the video signal from the encoder 144 in a suitable format such as National Television System Committee (NTSC), phase alternation by line (PAL), or sequential technique and memory storage (SECAM) and displays the graphics information.

The on-board AGP device 150 is a graphic device that is compatible to the AGP standard such as the AGP Version 2.0 Standard (published in "Accelerated Graphics Port Interface Specification" Revision 2.0 by Intel Corporation, May 4, 1998). The on-board AGP device 150 interfaces directly to the interface port 130 and is located on the motherboard that contains the processor 110. The AGP connector 152 is a connector that supports the AGP standard (e.g., version 2.0). The external AGP device 154 is an add-on AGP-compatible graphics device located externally to the motherboard. The ADD card 156 is a graphics device that interfaces to the AGP connector 152 and is compatible to the DVO mode. The ADD card 156 may support a 12-bit or 24-bit, 1.5 v signaling compliant DVO device.

The system memory 160 stores system code and data. The system memory 160 is typically implemented with dynamic random access memory (DRAM) or static random access memory (SRAM). The system memory may include an operating system, device drivers, and software to initialize or configure the various graphics modes. The system memory 140 may also include other programs or data, which are not shown depending on the various embodiments of the invention.

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media.

The I/O devices $180_1$ to $180_K$ may include any I/O devices to perform I/O functions. Examples of I/O devices $180_1$ to $180_K$ include controllers for input devices (e.g., keyboard, mouse, trackball, pointing device), media cards (e.g., audio, video, graphics), network cards, and any other peripheral controllers.

Figure 2A:
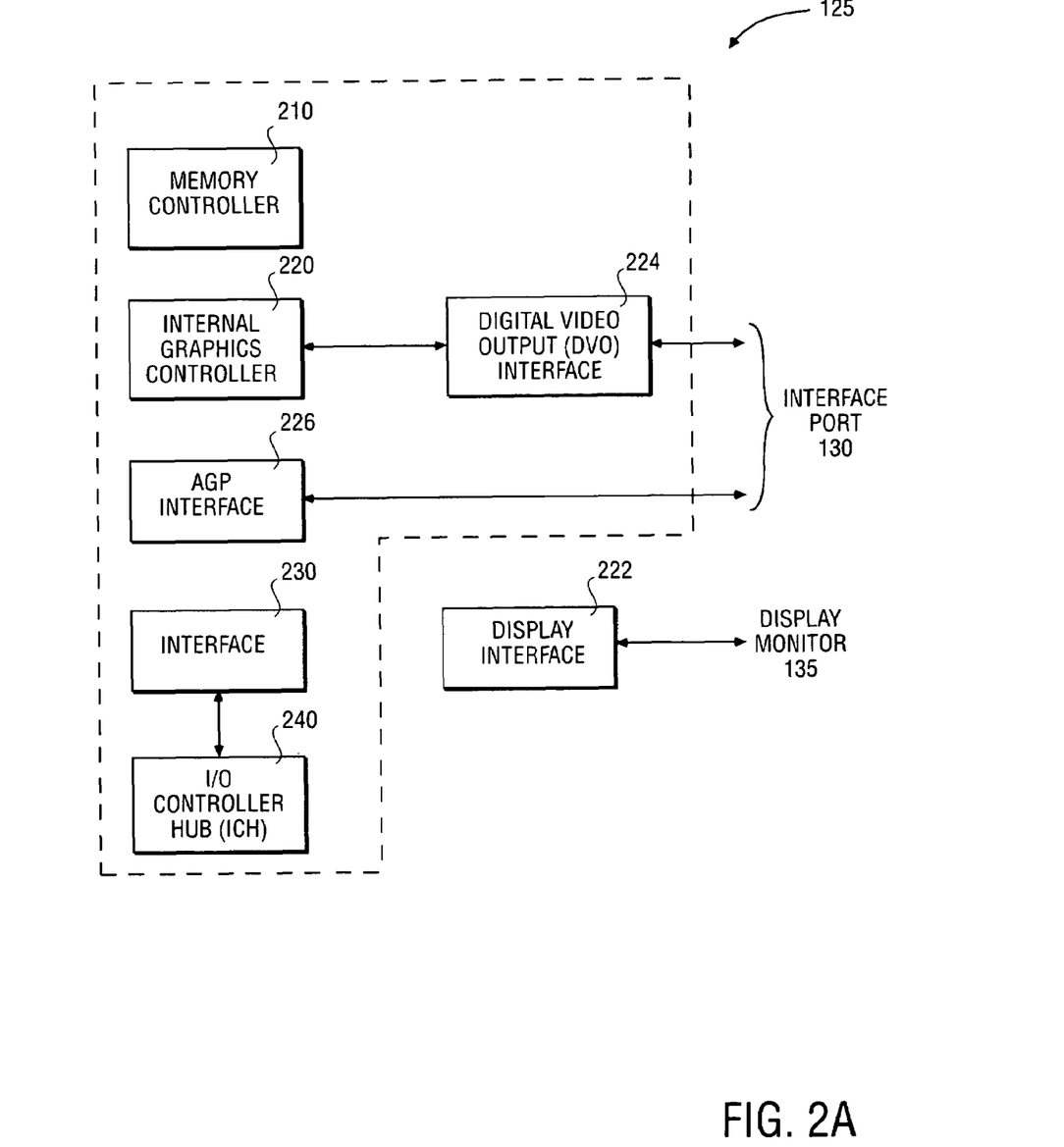
FIG. 2A is a diagram illustrating an integrated chipset located in the chipset space shown in FIG. 1 according to one embodiment of the invention.

FIG. 2A is a diagram illustrating an integrated chipset 205 located in the chipset space 125 shown in FIG. 1 according to one embodiment of the invention. The chipset space 125 is occupied by the integrated chipset 205. The integrated chipset 205 is a graphics and memory controller.

The integrated chipset 205 includes a memory controller 210, an internal graphics controller 220, a hub interface 230, and an optional I/O controller 240.

The memory controller 210 controls the system memory 140. The internal graphics controller 220 is a graphics engine that can perform a number of graphics operations. In one embodiment, the internal graphics controller 220 provides shading, filtering, clipping, and three-dimensional (3-D) transformations. The internal graphics controller 220 operates in parallel or works in conjunction with the AGP controller. The internal graphics controller 220 provides a display interface 222 and a DVO interface 224. The display interface 222 generates synchronization signals such as vertical sync and horizontal sync, red green blue (RGB) color information, and other video signals to drive an analog video display monitor. The DVO interface 224 generates DVO data and clock signals for DVO devices, and the display control signals (e.g., MI2C) that may be used to drive flat panel display.

The AGP interface 226 generates AGP-compatible signals for use in the AGP mode. The AGP interface 226 provides an upgrade path for graphics capability if the internal graphics controller 220 is not sufficient. The interface 230 provides interface signals to the I/O controller 240. The I/O controller 240 may be integrated within the chipset 205 or may be located externally to the chipset 205. The I/O controller 240 has a number of functionalities that are designed to support I/O functions. The I/O controller 240 may include a number of interface and I/O functions such as PCI bus interface, processor interface, interrupt controller, direct memory access (DMA) controller, power management logic, timer, universal serial bus (USB) interface, mass storage interface, low pin count (LPC) interface, etc. The I/O controller 240 includes a mass storage controller to control the mass storage device 170 (FIG. 1). It is contemplated that the system 100 may also include peripheral buses such as Peripheral Component Interconnect (PCI), accelerated graphics port (AGP), Industry Standard Architecture (ISA) bus, and Universal Serial Bus (USB), etc.

In many systems that use the integrated chipset 205, the AGP connector 152 (FIG. 1) is linked to the AGP interface 226 to provide a graphics upgrade path. When the AGP connector 152 is not populated with an external AGP device (e.g., the external AGP card 154 in FIG. 1), it is possible to make use of the multiplexed digital display channels via the ADD card 156. The ADD card 156 is plugged into the AGP connector 152 but has digital display devices that use the multiplexed digital display channels. Alternatively, DVO devices may be soldered down on the motherboard containing the processor 110.

Figure 2B:
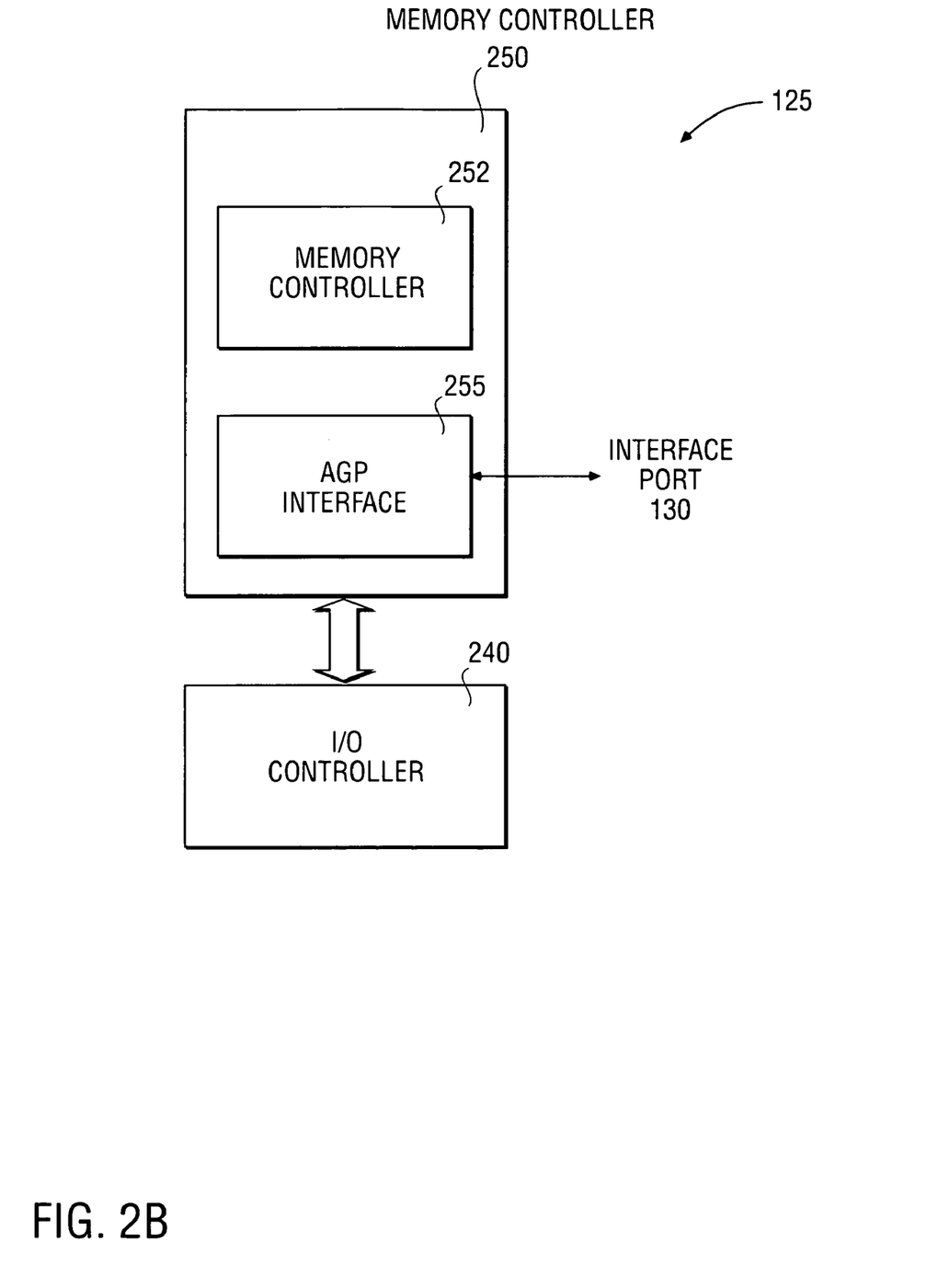
FIG. 2B is a diagram illustrating separate chipsets located in the chipset space shown in FIG. 1 according to one embodiment of the invention.

FIG. 2B is a diagram illustrating separate chipsets located in the chipset space 125 shown in FIG. 1 according to one embodiment of the invention. The chipset space 125 is occupied by memory controller 250 and I/O controller 240.

The memory controller 250 includes a controller 252 and an AGP interface 255. The memory controller 252 performs similar functions as the memory controller 210 shown in FIG. 2A. The AGP interface 255 provides AGP-compatible signals for AGP modes. The memory controller 250 does not have an internal graphics controller that supports the DVO mode. The I/O controller 240 is described above.

Since the memory controller 250 does not have an internal graphics controller, it can only support the AGP mode. The interface port 130 can be used for either DVO or AGP modes. The interface port 130 can be used with the memory controller 250 when the system is configured to operate in a suitable mode.

Figure 3:
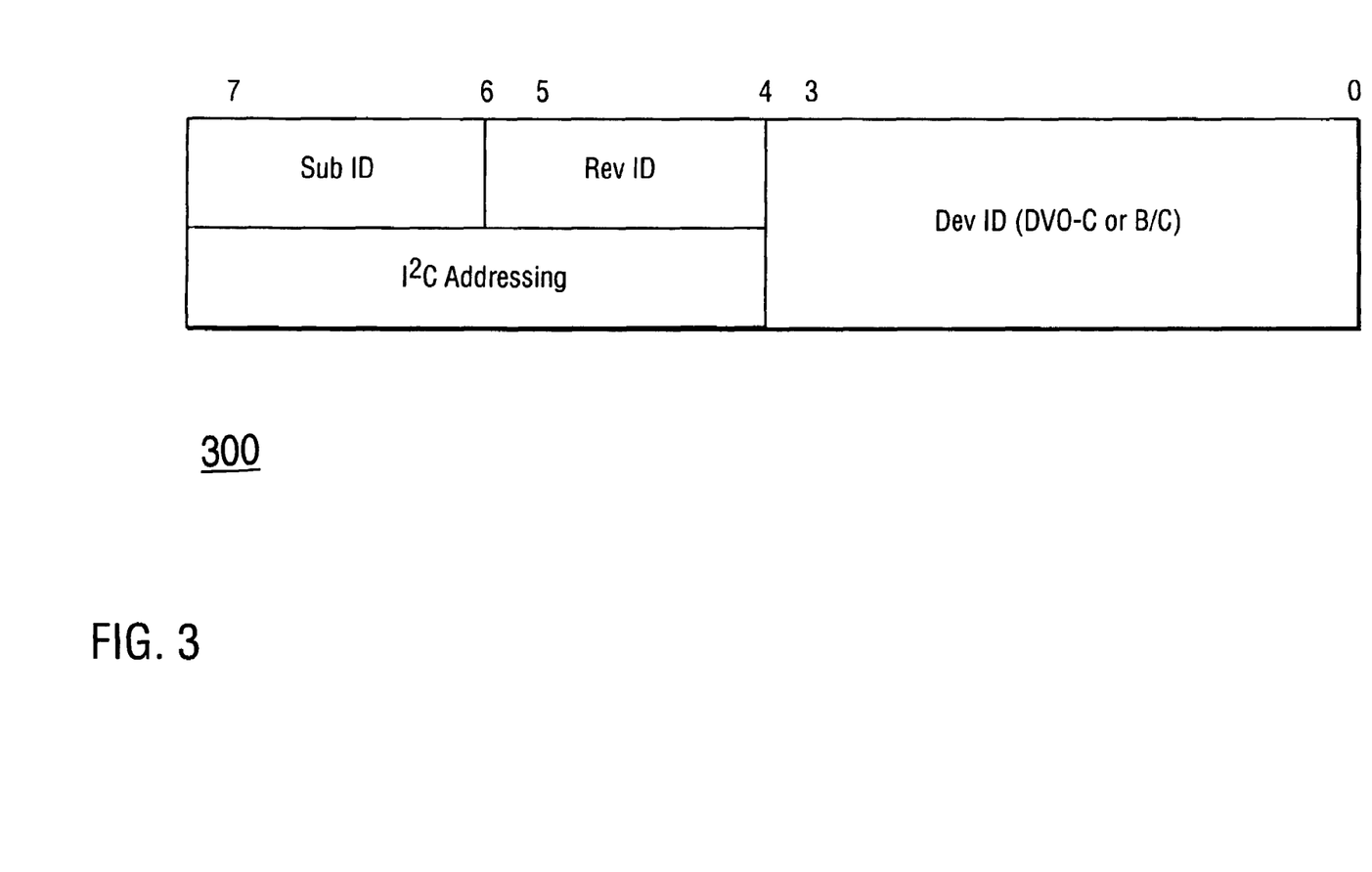
FIG. 3 is a diagram of an embodiment of an ADD ID register format.
Figure 4:
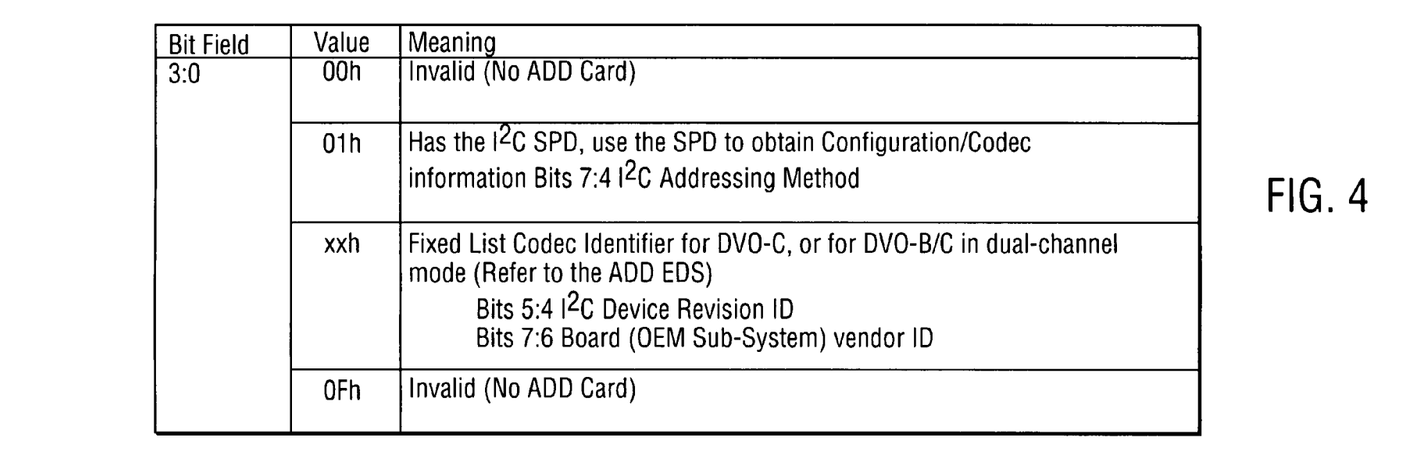
FIG. 4 is a diagram of an embodiment of bit field 3:0 of the ADD_ID register format shown in FIG. 3.

One embodiment of an ADD plug and play register 300 is shown in FIG. 3. FIG. 4 is a diagram of an embodiment of bit field 3:0 of the ADD_ID register format shown in FIG. 3. Referring to FIGS. 3 and 4, a 3:0 bit field having a value of 00h or 0Fh indicates an invalid state and no ADD card present. There are two cases for the usage of the upper fields (bits 7:4) of register 300. In the first case, a 3:0 bit field having a value of 01h indicates a "non-known" or "non-fixed" ADD_ID. Additional information is retrieved from the SPD. The SPD is used to obtain configuration/codec information. In such case, bits 7:4 of ADD register 300 indicates the I2C addressing method. In particular, if DEV ID indicates that is not on the fixed list and information needs to be retrieved out of the SPD, bits 7:4 indicate the I2C addressing for the reading the device.

In the second case, a 3:0 bit field having a value of xxh indicates a "known" or "fixed" list codec identifier for DVO-C or DVO-B/C in dual-channel mode. The ADD_ID directly translates into something known. The rest is plug and play information based on the ID. In particular, bits 5:4 indicate a revision ID (Rev ID). In plug and play, a revision ID identifies revisions or versions of a board. Bits 7:6 indicate an OEM vendor ID (Sub ID). More than one vendor can manufacture a product. In some cases, there may be some programmatic differences even with the same device. Those programmatic differences could be discernable if keyed off the subsystem vendor ID. One skilled in the art will recognize that device, revision and vendor ID are fundamental concepts of plug and play and the particular implementation of such is not critical to embodiments of the present invention.

Figure 5:
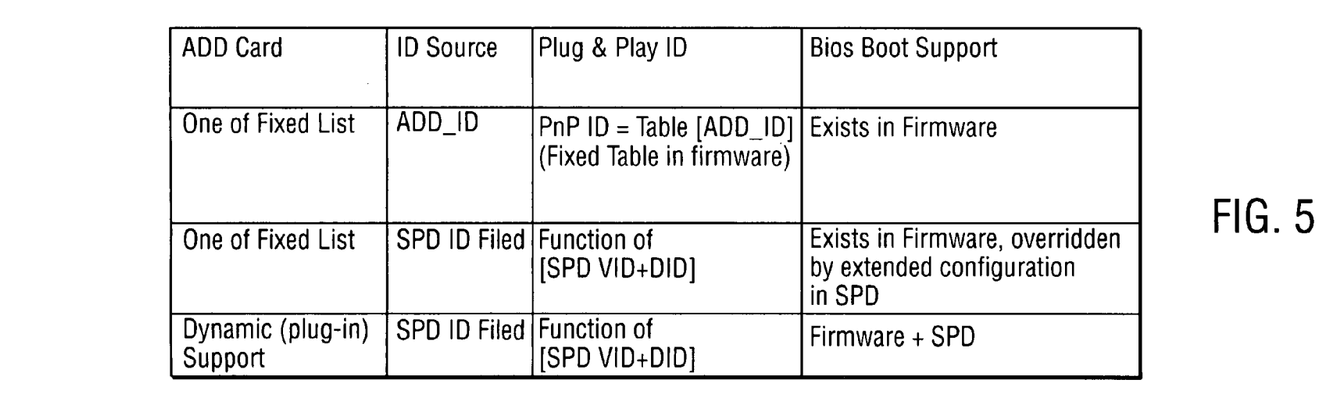
FIG. 5 is a diagram of an embodiment of ADD card plug and play identifier.

Referring to FIG. 5, a diagram of an embodiment of an ADD card plug and play identifier is illustrated. In the first configuration, the ADD card is one of the identified fixed list devices. In particular, as noted above, ADD card includes a "known" or "fixed" list codec identifier for DVO-C or DVO-B/C in dual-channel mode. The ADD_ID directly translates into something known. Plug and play information is accessed based on the ADD_ID. The BIOS boot support exists in firmware.

The second configuration is a combination of the first and third configurations. In particular, the ADD card is a fixed list device and the BIOS boot support exists in firmware but is overridden by extended configuration in SPD.

In the third configuration, the ADD card does not include a "fixed" card identifier. The ADD card requires dynamic (plug-in) support. In particular, additional information is retrieved from the SPD. The SPD is used to obtain configuration/codec information. The BIOS boot support exists in firmware and SPD.

Figure 6:
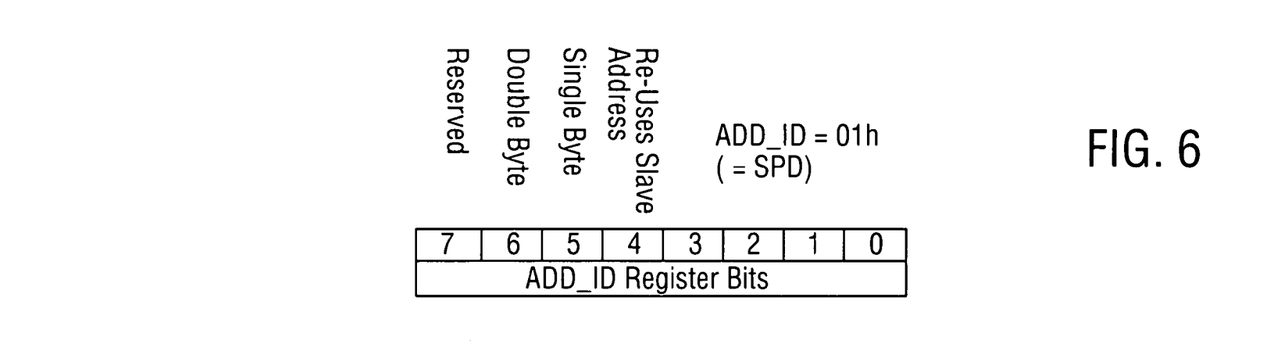
FIG. 6 is a diagram of an embodiment of ADD_ID meaning for serial presence detect (SPD) memory.

FIG. 6 is a diagram of an embodiment of ADD_ID meaning for SPD. As noted above, a 3:0 bit field having a value of 01h indicates a "non-known" (i.e. "non-fixed") ADD_ID. Additional information is retrieved from the SPD. The SPD is used to obtain configuration/codec information. In such case, bits 7:4 of ADD register 300 indicate the I2C addressing method. In particular, if DEV ID is not on the fixed list and information needs to be retrieved out of the SPD, bits 7:4 indicate the I2C addressing for the reading the device.

In this case, the upper bits indicate how to access the device. There are different SPD devices depending on their size. They may have different addressing requirements. This makes it easier to understand what the addressing mechanism is before reading the device.

Embodiments of the present invention identify the addressing types ahead of time. The addressing type is essentially embedded with the ID, thus facilitating the ability to communicate with the device.

Figure 7:
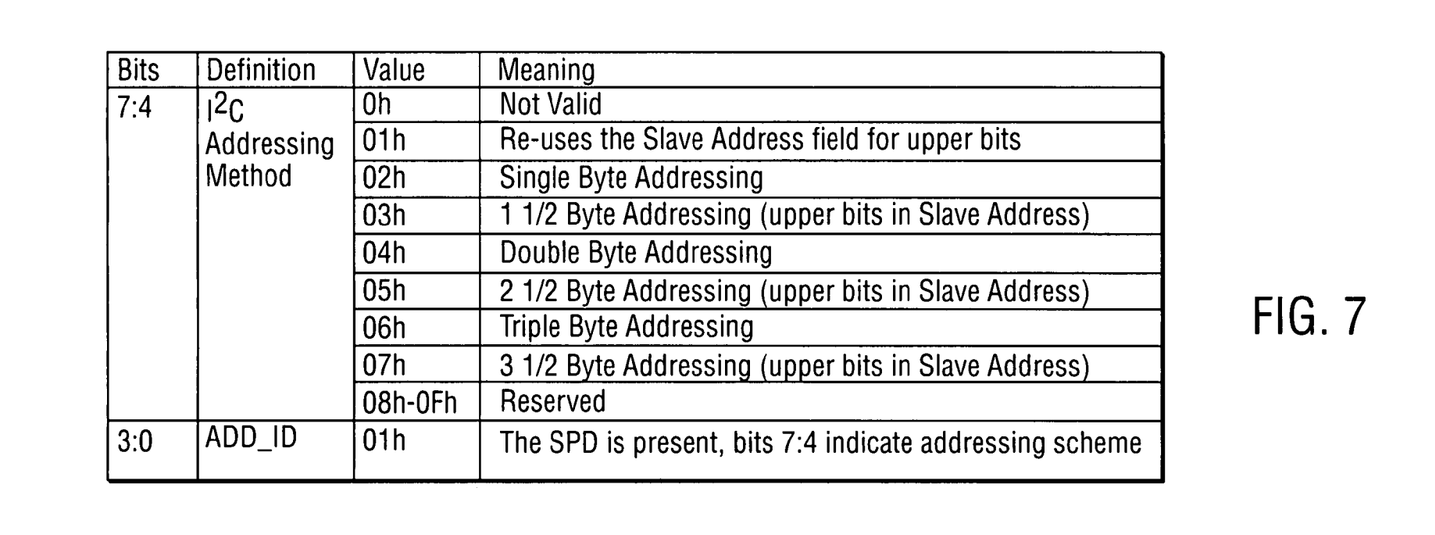
FIG. 7 is a diagram of an embodiment of SPD addressing types.

FIG. 7 is a diagram of an embodiment of SPD addressing types. a 3:0 bit field having a value of 01h indicates a "non-known" or "non-fixed" ADD_ID. Additional information is retrieved from the SPD. The SPD is used to obtain configuration/codec information. In such case, bits 7:4 of ADD register 300 indicates the I2C addressing method. In particular, if DEV ID indicates that is not on the fixed list and information needs to be retrieved out of the SPD, bits 7:4 indicate the I2C addressing for the reading the device. I2C has various addressing formats, including single byte addressing where a single byte of addressing is provided (for example, bits 7:4 have a value of 02h).

Figure 8:
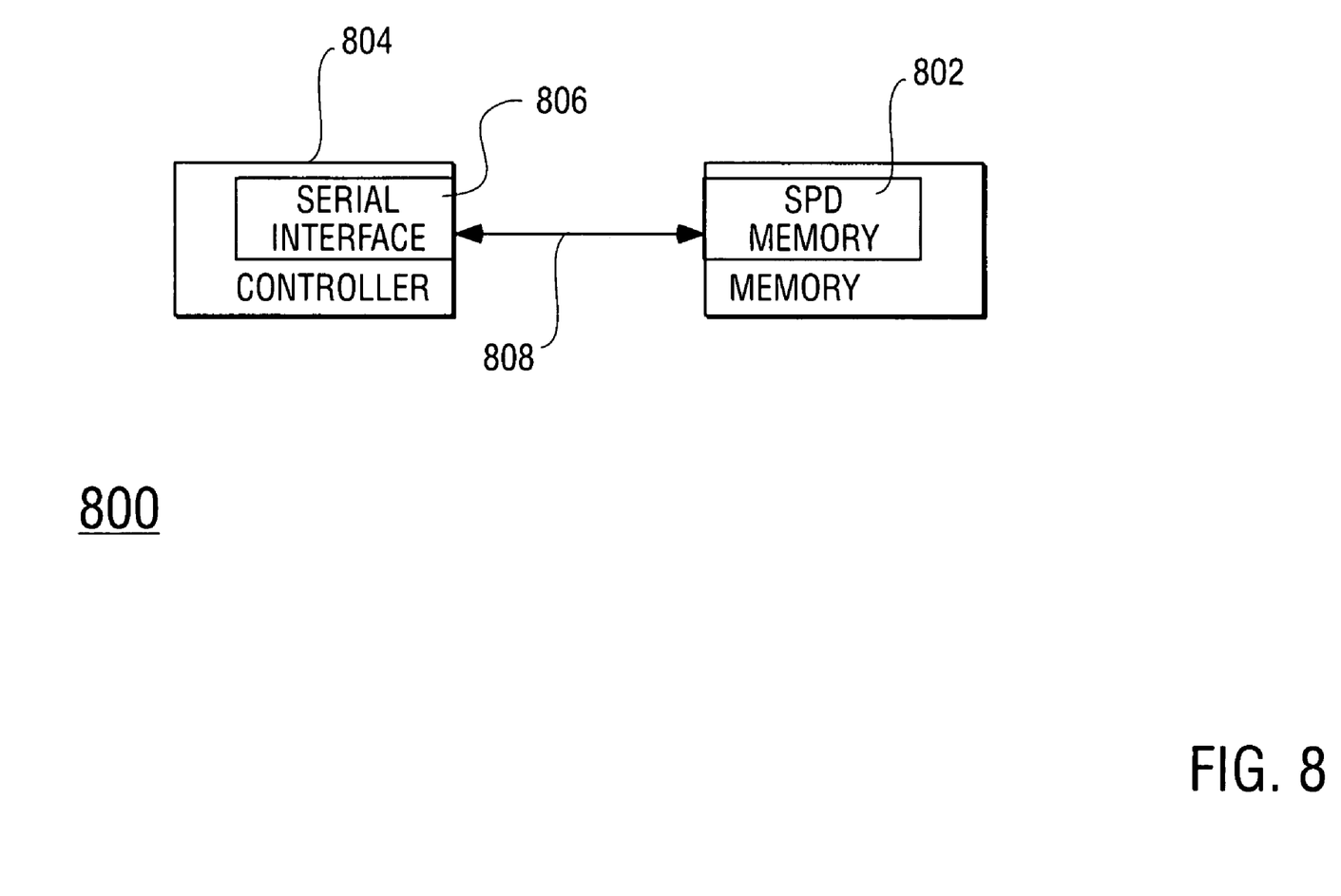
FIG. 8 is a diagram of an embodiment of an interface for a SPD memory.

FIG. 8 is a diagram of an embodiment 800 of an exemplary interface for SPD memory 802. The controller 804 contains a serial interface circuit 806 for interfacing with serial bus 808. A SPD memory 802 (a non-volatile memory such as an electrically erasable and programmable read only memory) may be read via the serial interface 808 according to a serial presence detect protocol. The SPD memory 802 may provide information such as timing information, device organization, and device technology about each particular memory module.

In one embodiment, the serial bus 808 is an I2C bus such as a system management bus (SMBus). This embodiment includes clock (SMBCLK) and data (SMBDATA) signals that follow the industry defined System Management Bus (SMBus) protocol as defined in the System Management Bus Specification, Revision 1.0, available from the Smart Battery Implementer's Forum. One skilled in the art will recognize that the invention may be extended to other multiplexed busses, for example, an alternative private acceleration bus to a supplementary graphics accelerator.

Figure 9:
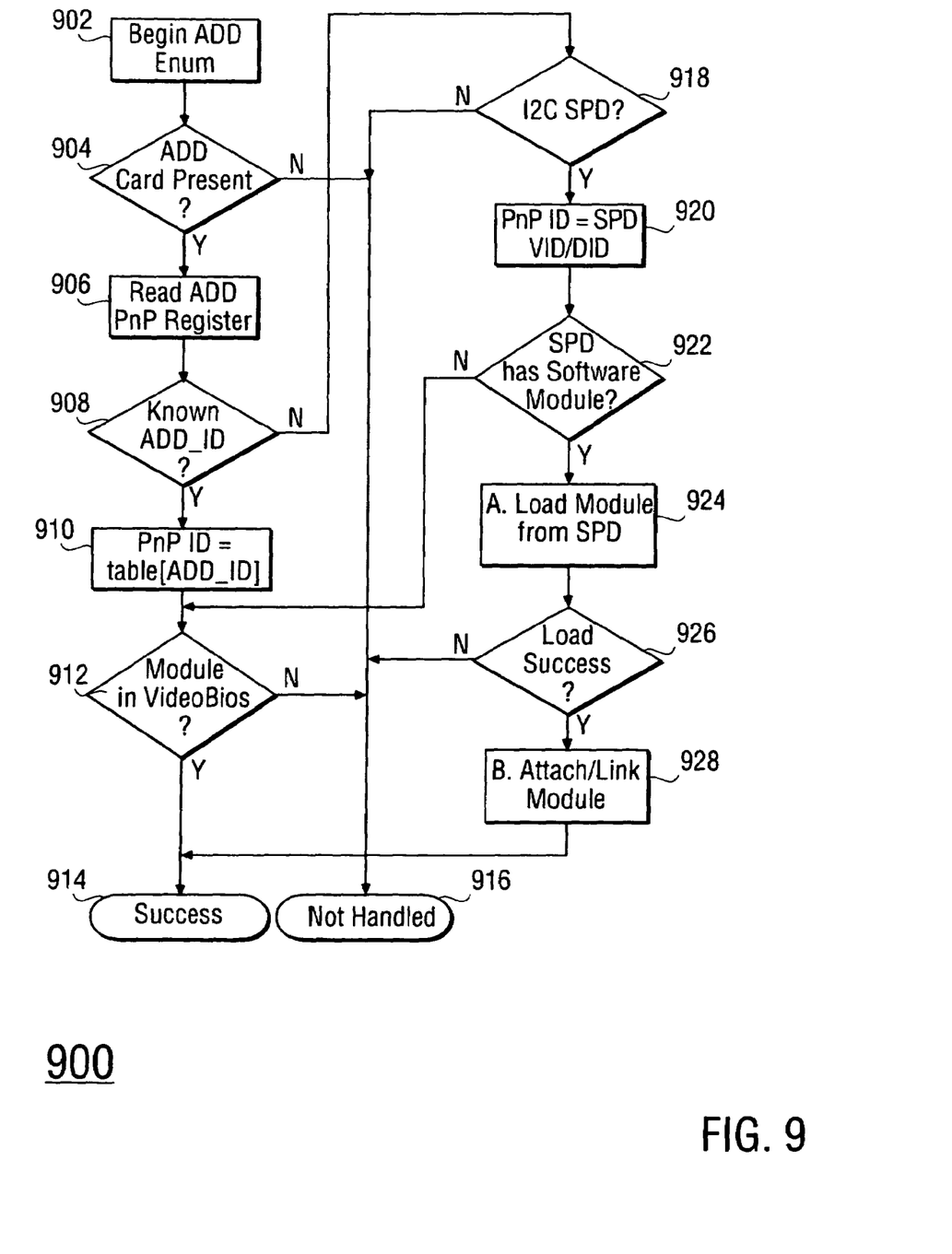
FIG. 9 is a flow diagram of an embodiment of a routine for ADD BIOS component enumeration.

FIG. 9 is a flow diagram of an embodiment 300 of a routine for an ADD card software load.

In step 902, the ADD enumeration begins.

In step 904, it is determined whether an ADD card is present.

In step 906, in response to an ADD card being present, the ADD register is read. One embodiment of an ADD register is shown in FIG. 3.

In step 908, upon reading the ADD register, it is determined whether the ADD card has a known ADD_ID. (In one implementation, ADD_ID is accessible via the Intel GMCH register at fixed MMIO location 71408h.) In particular, it is determined whether the ADD ID is one that is recognizable as belonging to a "known" list or whether there is plug and play information that needs to be retrieved. Some ADD devices do not include all the plug and play configuration information to save money.

In step 910, in response to an ADD card with a known ADD identification (ADD_ID), the plug and play ID is set to equal the table [ADD_ID]. One embodiment of ADD_ID bit fields of known ADD plug and play IDs and description is shown in FIG. 4. One embodiment of an ADD card plug and play identifier is shown in FIG. 5. Plug and Play ID identifies from where the load software should be linked.

In step 912, it is then determined whether there is a module in the video BIOS.

In step 914, in response to detecting a module in the video BIOS, the software load process is successfully completed.

In step 904, in response to no detected ADD card, the software load process is not handled (step 916).

In step 908, if the ADD card present does not include a known ADD_ID, it is determined whether I2C SPD is present on the ADD card. If so, the SPD is used to obtain configuration/codec information. If no SPD is detected, the process ends (step 916).

In particular, in step 920, if SPD is present, the plug and play ID is obtained from the SPD. For example, as shown in FIG. 4, bits 7:4 of the ADD register is used to retrieve and identify the additional plug and play information. In particular, the I2C addressing scheme is obtained.

In step 922, it is determined if the SPD has a software module.

The ADD_ID is thus the detection register in the chipset. When the card is inserted, the ADD_ID can be read to indicate ID, status and so forth. The ADD_ID indicates whether it is necessary to read or look for non-volatile memory (i.e. SPD). If there is no known ADD_ID detected, it is determined if additional SPD is present on card. The SPD is thus not just a receptacle for plug and play information. Rather, the SPD is programmable non-volatile memory on the card. If SPD is present, the non-volatile memory is read to determine if there is additional code (in addition to data) to support the card.

In step 924, in response to a detected software module present in the SPD, the software module is loaded.

In step 926, it is determined whether the software module has been successfully loaded.

In step 928, in response to the software module being successfully loaded, the module is linked to the video BIOS.

If the software module is not successfully loaded, the software load process is not handled (step 916).

In step 914, the load process is successfully completed.

In step 922, if the SPD does not have a software module, it is determined whether there is a software module in the video BIOS general controller software (step 912). If so, the software load process is successfully completed (step 914). If not, the software load process is not handled (step 916).

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    detecting whether an external card is used in a first graphics mode of a plurality of graphics modes available to the external card;
    detecting an identifier associated with the external card; and
    retrieving support components in response to the identifier including retrieving support components from serial presence detect memory in response to the external card having an identifier that does not correspond to one of a fixed list of identifiers.

2. The method claimed in claim 1, wherein the first graphics mode is a digital video output (DVO) mode.

3. The method claimed in claim 1, wherein the external card is an AGP digital display card (ADD).

4. The method claimed in claim 1, wherein detecting an identifier associated with the external card further comprises:
    reading a register associated with the external card to determine the identifier.

5. The method claimed in claim 4, wherein detecting an identifier associated with the external card further comprises:
    determining whether the external card has an identifier that corresponds to one of a fixed list of identifiers.

6. The method claimed in claim 5, wherein retrieving support components in response to the identifier further comprises:
    retrieving support components from firmware in response to the external card having an identifier that corresponds to one of a fixed list of identifiers.

7. The method claimed in claim 5, further comprising:
    retrieving support components from video BIOS firmware in response to the external card having an identifier that corresponds to one of a fixed list of identifiers.

8. The method claimed in claim 7, further comprising:
    reading the register associated with the external card to determine the device and vendor identification information.

9. The method claimed in claim 6, wherein retrieving support components in response to the identifier further comprises:
    retrieving support components from non-volatile memory in response to the external card having an identifier that corresponds to one of a fixed list of identifiers and support components exist within native firmware.

10. The method claimed in claim 5, wherein retrieving support components in response to the identifier further comprises:
    retrieving support components from non-volatile memory in response to the external card having an identifier that does not correspond to one of a fixed list of identifiers.

11. The method claimed in claim 10, wherein retrieving support components from the serial presence detect memory in response to the external card having an identifier that does not correspond to one of a fixed list of identifiers further comprises:
    reading the register associated with the external card to determine the serial presence detect memory addressing routine.

12. The method claimed in claim 1, wherein an 12C bus is associated with the serial presence detect memory.

13. A machine readable medium having stored therein a plurality of machine readable instructions executable by a processor, comprising:
    instructions to detect whether an external card is used in a first graphics mode of a plurality of graphics modes available to the external card;
    instructions to detect an identifier associated with the external card; and
    instructions to retrieve support components in response to the identifier including instructions to retrieve support components from serial presence detect memory in response to the external card having an identifier that does not correspond to one of a fixed list of identifiers.

14. The machine readable medium claimed in claim 13, wherein the first graphics mode is a digital video output (DVO) mode.

15. The machine readable medium claimed in claim 13, wherein the external card is an AGP digital display card (ADD).

16. The machine readable medium claimed in claim 13, wherein instructions to detecting an identifier associated with the external card further comprises:
    instructions to reading a register associated with the external card to determine the identifier.

17. The machine readable medium claimed in claim 16, wherein instructions to detecting an identifier associated with the external card further comprises:

instructions to determining whether the external card has an identifier that corresponds to one of a fixed list of identifiers.

18. The machine readable medium claimed in claim 17, wherein instructions to retrieving support components in response to the identifier further comprises:
   instructions to retrieving support components from firmware in response to the external card having an identifier that corresponds to one of a fixed list of identifiers.

19. The machine readable medium claimed in claim 17, further comprising:
   instructions to retrieving support components from video BIOS firmware in response to the external card having an identifier that corresponds to one of a fixed list of identifiers.

20. The machine readable medium claimed in claim 19, further comprising:
   instructions to reading the register associated with the external card to determine the device and vendor identification information.

21. The machine readable medium claimed in claim 18, wherein retrieving support components in response to the identifier further comprises:
   instructions to retrieving support components from non-volatile memory in response to the external card having an identifier that corresponds to one of a fixed list of identifiers and support components exist within native firmware.

22. The machine readable medium claimed in claim 17, wherein instructions to retrieve support components in response to the identifier further comprises:
   instructions to retrieve support components from non-volatile memory in response to the external card having an identifier that does not correspond to one of a fixed list of identifiers.

23. The machine readable medium claimed in claim 22, wherein instructions to retrieve support components from the serial presence detect memory in response to the external card having an identifier that does not correspond to one of a fixed list of identifiers further comprises:
   instructions to read the register associated with the external card to determine the serial presence detect memory addressing routine.

24. The machine readable medium claimed in claim 13, wherein an I2C bus is associated with the serial presence detect memory.

25. An apparatus comprising:
   a non-volatile memory device containing support data;
   a communication bus for the memory device; and
   a controller to determine the support components for an external card operating in a first graphics mode of a plurality of graphics modes available to the external card, wherein the controller detects an identifier associated with the external card; and retrieves support components in response to the identifier including retrieving support components from serial presence detect memory in response to the external card having an identifier that does not correspond to one of a fixed list of identifiers.

26. The apparatus claimed in claim 25, wherein the first graphics mode is a digital video output (DVO) mode.

27. The apparatus claimed in claim 25, wherein the external card is an AGP digital display card (ADD).

28. The apparatus claimed in claim 26, wherein the controller reads a register associated with the external card to determine the identifier.

29. The apparatus claimed in claim 27, wherein the controller determines whether the external card has an identifier that corresponds to one of a fixed list of identifiers.

30. The apparatus claimed in claim 28, wherein the controller retrieves support components from firmware in response to the external card having an identifier that corresponds to one of a fixed list of identifiers.

31. The apparatus claimed in claim 28, wherein the controller retrieves support components from non-volatile memory in response to the external card having an identifier that corresponds to one of a fixed list of identifiers and support components exist within native firmware.

32. A device comprising:
   a detector to determine the support components for an external card operating in a first graphics mode of a plurality of graphics modes available to the external card, wherein the detector detects an identifier associated with the external card and retrieves support components in response to the identifier including retrieving support components from serial presence detect memory in response to the external card having an identifier that does not correspond to one of a fixed list of identifiers.

33. The device claimed in claim 32, wherein the first graphics mode is a digital video output (DVO) mode.

34. The device claimed in claim 32, wherein the external card is an AGP digital display card (ADD).

35. The device claimed in claim 33, wherein the detector reads a register associated with the external card to determine the identifier.

36. The device claimed in claim 34, wherein the detector determines whether the external card has an identifier that corresponds to one of a fixed list of identifiers.

37. The device claimed in claim 35, wherein the detector retrieves support components from firmware in response to the external card having an identifier that corresponds to one of a fixed list of identifiers.

38. The device claimed in claim 35, further comprising:
   a non-volatile memory device containing support data, wherein the detector retrieves support components from non-volatile memory in response to the external card having an identifier that corresponds to one of a fixed list of identifiers and support components exist within native firmware.

* * * * *